(12) United States Patent
Matsumoto et al.

(10) Patent No.: US 6,632,913 B2
(45) Date of Patent: Oct. 14, 2003

(54) METHOD FOR PRODUCING LIQUID URETHANE PREPOLYMER AND RESIN COMPOSITION

(75) Inventors: Yasuhiro Matsumoto, Nara (JP); Hideyuki Takeuchi, Osaka-fu (JP); Hiroki Tanaka, Osaka-fu (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 09/978,011

(22) Filed: Oct. 17, 2001

(65) Prior Publication Data

US 2002/0077444 A1 Jun. 20, 2002

(30) Foreign Application Priority Data

Oct. 19, 2000 (JP) .................................... P. 2000-319336

(51) Int. Cl.[7] ................................................ C08G 18/10
(52) U.S. Cl. ............................. 528/45; 525/65; 525/66; 525/80
(58) Field of Search ............................... 528/45, 65, 66, 528/80

(56) References Cited

U.S. PATENT DOCUMENTS

| 4,098,743 A | * | 7/1978 | Scriven et al. |
| 4,446,293 A | * | 5/1984 | Konig et al. ................... 528/45 |
| 4,694,051 A | * | 9/1987 | Kordomenos et al. ...... 525/437 |

FOREIGN PATENT DOCUMENTS

JP 1-21190 4/1989

* cited by examiner

*Primary Examiner*—Ana Woodward
(74) *Attorney, Agent, or Firm*—Armstrong, Westerman & Hattori, LLP

(57) ABSTRACT

A method for producing an isocyanate group-blocked liquid urethane prepolymer which comprises: reacting a lactone-modified diol (3) with a polyfunctional isocyanate (4) to form an isocyanate group-having urethane prepolymer (5), wherein said lactone-modified diol (3) is obtainable by ring-opening addition polymerization of a lactone monomer (2) with a diol (1) selected from the group consisting of a polyalkylene ether diol, a polyester diol and a polycarbonate diol; and then reacting said urethane prepolymer with a blocking agent (6).

9 Claims, No Drawings

METHOD FOR PRODUCING LIQUID URETHANE PREPOLYMER AND RESIN COMPOSITION

FIELD OF THE INVENTION

The present invention relates to a method for producing a liquid urethane prepolymer and to a resin composition using the same. More precisely, it relates to a method for producing an isocyanate group-blocked urethane prepolymer which is used for artificial leathers, synthetic leathers, paints, coating agents, adhesives, sealants, pressure sensitive adhesives, films, sheets, cast articles, and the like, and is liquid even without solvent. The present invention also relates to a resin composition using the same.

BACKGROUND OF THE INVENTION

Recently, it is required to reduce organic solvents from solution type resins such as paints wherein organic solvents are used, from the viewpoint of global environmental regulations. In particular, by the enforcement of PRTR Law, revised Industrial Safety and Health Law, and the like, the reduction of organic solvents and the like becomes a very important theme. The same applies to solution-type urethane resins which are used for synthetic leathers, artificial leathers, adhesives, films, and the like, and thus, there has been carried out researches for developing solvent-free urethane resins containing no organic solvent. In general, urethane resins have very large molecular weight and therefore, without solvent, they becomes rubbery solid which does not flow at all at room temperature, so that it is impossible to subject them to processing such as coating, impregnation, and the like. In some cases, lowering the molecular weight improves flowability and thus enables processing such as coating, impregnation, and the like, but the resulting resin exhibits poor mechanical strength and durability owing to the small molecular weight and is unsuitable for use.

As methods for improving the above, there are proposed methods wherein a liquid substance having a low molecular weight is used at processing such as coating, impregnation, and the like for enabling the processing even without solvent, and is subjected to thermal treatment after the processing to form a substance having a high molecular weight. For example, JP-B-1-21190 (The term "JP-B" used herein means an examined Japanese patent publication.) discloses a method wherein an isocyanate group-blocked urethane prepolymer (an oligomer obtained by reacting excess molar amount of polyfunctional isocyanate with a polyol and further blocking the isocyanate group) and a diamine as a chain extending agent or a crosslinking agent are blended and processing such as coating and the like is carried out, then the blockage is removed by thermal treatment, and the resulting substance is reacted with the diamine to form a substance having a high molecular weight substance. In the patent publication, it is described that a polyether having 2 to 3 hydroxyl groups and a molecular weight of 500 to 10000 and/or a polyester having 2 to 3 hydroxyl groups and a molecular weight of 1000 to 6000 can be used as the polyol. Furthermore, according to the patent publication, a liquid substance without solvent can be formed only in the case that a propylene oxide-type polyether is used as the polyol, and liquid substance is not formed in the case of combined use of the polyether and a polyester or sole use of a polyester. That is, in the conventional technology, for obtaining a liquid isocyanate group-blocked urethane prepolymer without solvent, only a propylene oxide-type polyether can be used as the polyol. However, a polyurethane polyurea resin prepared by using a prepolymer made from a propylene oxide-type polyether has serious defects that thermal resistance, light resistance, mechanical resistance, and the like are poor, and therefore, is practically problematic.

SUMMARY OF THE INVENTION

In view of the circumstances as described above, an object of the invention is to provide an isocyanate group-blocked urethane prepolymer which is liquid without solvent and which may be used as a main material for polyurethane resins excellent in durability such as thermal resistance and light resistance and in mechanical strength.

Other objects and effects of the present invention will become apparent from the following description.

As a result of extensive studies on the above problems, the present inventors found that an isocyanate group-blocked urethane prepolymer, which is obtained by adding a lactone monomer to a diol selected from a polyalkylene ether diol, a polyester diol and a polycarbonate diol to form a lactone-modified diol and reacting it with a polyfunctional isocyanate, becomes liquid even without solvent. Furthermore, they also found that a polyurethane resin prepared by using the prepolymer has extremely excellent durability such as thermal resistance and light resistance and has extremely excellent mechanical strength as compared with a resin wherein a propylene oxide-type polyether is used. Based on the findings, the present invention has been accomplished.

That is, the present invention relates to a method for producing an isocyanate group-blocked liquid urethane prepolymer which comprises:

reacting a lactone-modified diol (3) with a polyfunctional isocyanate (4) to form an isocyanate group-having urethane prepolymer (5), wherein said lactone-modified diol (3) is obtainable by ring-opening addition polymerization of a lactone monomer (2) with a diol (1) selected from the group consisting of a polyalkylene ether diol, a polyester diol and a polycarbonate diol; and then reacting said urethane prepolymer with a blocking agent (6).

The present invention also relates a resin composition comprising a liquid urethane prepolymer obtained by the above-described production method and a compound having two or more active hydrogens.

DETAILED DESCRIPTION OF THE INVENTION

The polyalkylene ether diol for use in the invention generally includes products of homopolymerization of any of intramolecular cyclic ether compounds such as ethylene oxide, 1,2- and 1,3-propylene oxide, 1,2-, 2,3- and 1,4-butylene oxide and an alkyltetrahydrofuran, and products of random or block copolymerization of two or more of them, and the like. Particularly preferred are ring opening polymerization products and addition polymerization products of 1,4-butylene oxide (tetrahydrofuran) alone or of two or more alkylene oxides including the same.

The polyester diol for use in the invention includes reaction products of a dihydric alcohol with a dibasic carboxylic acid. Instead of a free dicarboxylic acid, a corresponding acid anhydride, a diester of a lower alcohol, or a mixture thereof may be used for the production of the polyester.

The dihydric alcohol is not especially limited, and includes ethylene glycol, 1,3- and 1,2-propylene glycol, 1,4- and 1,3- and 2,3-butylene glycol, 1,5-pentanediol, 1,6-hexane glycol, 1,8-octanediol, 1,9-nonanediol, 1,10-decanediol, neopentyl glycol, cyclohexanedimethanol, 1,4-bis-(hydroxymethyl)-cyclohexane, 2-methyl-1,3-propanediol, 2,2,4-trimethyl-1,3-pentanediol, diethylene glycol, dipropylene glycol, triethylene glycol, tripropylene glycol, dibutylene glycol, polyethylene glycol, polypropylene glycol, polytetramethylene glycol, and the like.

The dibasic carboxylic acid may be aliphatic, alicyclic, aromatic and/or heterocyclic, may be saturated or unsaturated, and may be substituted by, for example, a halogen atom. Examples of the carboxylic acid include, though not limited thereto, succinic acid, adipic acid, suberic acid, azelaic acid, sebacic acid, phthalic acid, isophthalic acid, terephthalic acid, trimesic acid, phthalic anhydride, tetrahydrophthalic anhydride, hexahydrophthalic anhydride, tetrahydroisophthalic anhydride, hexahydroisophthalic anhydride, endomethylenetetrahydrophthlic anhydride, glutaric anhydride, maleic anhydride, maleic acid, fumaric acid, dimeric fatty acid, e.g., oleic acid, dimethyl terephthalate, and mixed terephthalate.

Among them, particularly preferred is a polyester diol obtained from an alkylene glycol having 2 to 10 carbon atoms and adipic acid.

The polycarbonate diol for use in the invention includes reaction products of a diol such as ethylene glycol, 1,3- and 1,2-propylene glycol, 1,4- and 1,3- and 2,3-butylene glycol, 1,6-hexane glycol, 1,8-octanediol, 1,9-nonanediol, 1,10-decanediol, neopentyl glycol, cyclohexanedimethanol, 1,4-bis-(hydroxymethyl)-cyclohexane, 2-methyl-1,3-propanediol, 2,2,4-trimethyl-1,3-pentanediol, diethylene glycol, dipropylene glycol, triethylene glycol, tripropylene glycol, dibutylene glycol, polyethylene glycol, polypropylene glycol, polytetramethylene glycol, and the like with phosgene, diallyl carbonate, a dialkyl carbonate or a cyclic carbonate (e.g., ethylene carbonate). Among them, preferred is a polycarbonate diol of an alkylene glycol having 4 to 10 carbon atoms.

The molecular weight of the diol (1) selected from a polyalkylene ether diol, a polyester diol and a polycarbonate diol is preferably from 500 to 2000. The molecular weight used herein means molecular weight calculated from the hydroxyl value of the diol.

Moreover, as the lactone monomer (2), one or two or more of valerolactone, methylvalerolactone, ε-caprolactone, trimethylcaprolactone and the like can be used. In particular, ε-caprolactone is preferably used.

The modification rate of the lactone is not particularly limited. However, in view of decreasing the viscosity of an isocyanate group-blocked prepolymer and liquefying the same, it is most preferred that 10 to 100 parts by weight of the lactone monomer (2) is subject to ring-opening addition polymerization with respect to 100 parts by weight of the diol (1).

The method for producing the lactone-modified diol (3) is not particularly limited, but the compound can be generally obtained by reacting the diol (1) with one of various lactone monomers as described above without solvent in the presence of a catalyst such as tetraisobutyl titanate, tetrabutyl titanate, stannous octylate, or zinc acetylacetonate at 110 to 220° C.

The polyfunctional isocyanate (4) for use in the invention is not particularly limited, and includes tetramethylene diisocyanate, 1,6-hexamethylene diisocyanate, dodecamethylene diisocyanate, cyclohexane-1,3- and 1,4-diisocyanate, 1-isocyanato-3-isocyanatomethyl-3,5,5-trimethylcyclohexane (=isophorone diisocyanate), bis-(4-isocyanatocyclohexyl)methane (=hydrogenated MDI), 2- and 4-isocyanatocyclohexyl-2'-isocyanatocyclohexylmethane, 1,3- and 1,4-bis-(isocyanatomethyl)-cyclohexane, bis-(4-isocyanato-3-methylcyclohexyl)methane, 1,3- and 1,4-tetramethylxylidene diisocyanate, 2,4- and/or 2,6-diisocyanatotoluene, 2,2'-, 2,4'- and/or 4,4'-diisocyanatodiphenylmethane, 1,5-naphthalene diisocyanate, p- and m-phenylene diisocyanate, xylylene diisocyanate, diphenyl-4,4'-diisocyanate, carbodiimide-modified liquid MDI, polymeric MDI, and the like. Among them, preferred is a so-called aromatic isocyanate wherein isocyanate groups are attached to a benzene ring.

The method for producing an isocyanate group-having urethane prepolymer (5) by reacting the lactone-modified diol (3) with a polyfunctional isocyanate (4) is not particularly limited, and the prepolymer can be obtained by reacting the polyfunctional isocyanate (4) with the lactone-modified diol (3) under stirring at a temperature of 20 to 120° C. in the absence of a catalyst or in the presence of a known catalyst for urethane formation or with adding a reaction retardant, the molar ratio of NCO group/OH group of the components (4) and (3) being in the range of 5.0/1.0 to 1.3/1.0.

As the blocking agent (6) for use in the invention, a known conventional isocyanate-blocking agent such as a ketoxime, a lactam, a phenol, a pyrazole, or an active methylene compound is employed. Among them, a ketoxime is preferred because blocking reaction proceeds easily and deblocking can be effected under a relatively mild heating condition, i.e., a dissociation temperature of 120 to 180° C. Particularly preferred blocking agent in the invention is methyl ethyl ketoxime (butanone oxime).

The blocking reaction wherein the urethane prepolymer (5) is reacted with the blocking agent (6) is carried out under stirring under reaction conditions that a molar ratio of NCO group/OH group of the blocking agent (6) and the urethane prepolymer (5) is in the range of 1.2/1.0 to 1.0/1.0 and a temperature is from 20 to 120° C.

The reason why the isocyanate group-blocked urethane prepolymer becomes liquid is uncertain, but it is presumably attributed to destroyed crystalline structure of a crystalline diol by modification with a lactone. Incidentally, the "liquid" used herein means that the prepolymer is not crystallized at ordinary temperature (25° C.).

The isocyanate group-blocked urethane prepolymer of the invention is liquid by itself, but a small amount of a solvent may be used for the purpose of, for example, lowering the viscosity at processing. As the solvent, there may be used known and conventional various organic solvents such as ethyl acetate, n-butyl acetate, methyl ethyl ketone, toluene, tetrahydrofuran, isopropanol, cyclohexanone, dimethylformamide (DMF), ethylene glycol monomethyl ether or ethylene glycol monoethyl ether acetate.

Moreover, to the isocyanate group-blocked urethane prepolymer of the invention may be added an antioxidant, an ultraviolet absorber, a photostabilizer, a lubricant, a pigment, a filler, an antistatic agent, a plasticizer, or other additives at any reaction stage, if necessary.

The isocyanate group-blocked urethane prepolymer of the invention is used in the form of a blend with a compound having two or more active hydrogens as a chain extending agent. Among the compounds having two or more active hydrogens, particularly preferred are diamine compounds. Examples of the diamine compounds usable include, though only particularly representative ones are enumerated, 1,2-diaminoethane, 1,2- or 1,3-diaminopropane, 1,2- or 1,3- or 1,4-diaminobutane, 1,5-diaminopentane, 1,6-diaminohexane, piperazine, N,N'-bis-(2-aminoethyl) piperazine, 1-amino-3-aminomethyl-3,5,5-trimethyl-cyclohexane (=isophoronediamine), bis-(4-aminocyclohexyl)methane, bis-(4-amino-3-butylcyclohexyl)methane, 1,2-, 1,3- or 1,4-diaminocyclohexane or 1,3-diaminopropnane, norbornenediamine, 4,4'-methylene-bis-2-methylcclohexylamine, and the like.

The isocyanate group-blocked urethane prepolymer of the invention and the diamine are used in such a ratio that the molar ratio of NCO group/$NH_2$ group of the isocyanate group-blocked urethane prepolymer component and the diamine component becomes in the range of 1.35/1.0 to 1.0/1.0.

In the invention, the compound having two or more active hydrogens as a chain extending agent is preferably an diamine compound, but a diol compound may be also used.

The diol compound is not particularly limited and use can be also made of ethylene glycol, 1,3- and 1,2-propylene glycol, 1,4- and 1,3- and 2,3-butylene glycol, 1,5-pentanediol, 1,6-hexane glycol, 1,8-octanediol, 1,9-nonanediol, 1,10-decanediol, neopentyl glycol, cyclohexanedimethanol, 1,4-bis-(hydroxymethyl)-cyclohexane, 2-methyl-1,3-propanediol, 2,2,4-trimethyl-1,3-pentanediol, diethylene glycol, dipropylene glycol, triethylene glycol, tripropylene glycol, dibutylene glycol, polyethylene glycol, polypropylene glycol, polytetramethylene glycol, and the like.

The resin composition of the invention is subjected to processing such as coating, impregnation, casting or the like at room temperature or with heat treatment, and treated under heating at a temperature higher than the temperature at which the blocking agent is dissociated, whereby a product having a high molecular weight is formed.

The resin composition of the invention may be usable for various uses such as artificial leathers, synthetic leathers, adhesives, sealants, pressure sensitive adhesives, coating agents, films, sheets, molded articles, and the like.

The isocyanate group-blocked urethane prepolymer according to the invention is liquid without solvent, and thus, is usable without solvent at processing such as coating, casting, or the-like. Furthermore, the resin obtained from the prepolymer is excellent in durability and mechanical strength as compared with the case that polypropylene oxide-type polyether is used. Accordingly, the prepolymer has remarkable advantages that it is practical and is not harmful to the environment.

EXAMPLES

The present invention will be illustrated in greater detail with reference to the following Examples, but the invention should not be construed as being limited thereto. All the "part(s)" and "%" are given by weight unless otherwise indicated. In addition, the "molecular weight" represents a molecular weight calculated from a hydroxyl value.

Reference Example 1

A four-necked flask fitted with a stirrer, a thermometer, an $N_2$ inlet tube, and an air-cooling condenser was set in a mantle heater, and the flask was charged with 1500 parts of polytetramethylene ether glycol (PTMG, molecular weight: 1300) and 1000 parts of ε-caprolactone monomer (hereinafter, abbreviated as ε-CL) (PTMG/ε-CL=60/40). After homogeneous mixing by $N_2$ blowing and stirring, 0.075 part of tetraisopropyl titanate (ratio to the whole charged amount: 30 ppm) was added and heating was started to raise the temperature to 180° C. Thereafter, the whole was kept at 180° C. for 5 hours, and then the mantle heater was removed. After air-cooling to about 80° C., a product was isolated. The OH value of the product was 48.9 (molecular weight: 2294).

Reference Example 2

A product was synthesized in the same manner as in Reference Example 1 with the exception that 1500 parts of PTMG having a molecular weight of 1000 was used instead of 1500 parts of PTMG having a molecular weight of 1300. The OH value of the product was 64.6 (molecular weight: 1737).

Reference Example 3

A product was synthesized in the same manner as in Reference Example 1 with the exception that 1250 parts of a copolymer of THF and methyl-THF (PTGL manufactured by Hodogaya Chemical Co., Ltd.) (molecular weight: 1000) was used instead of 1500 parts of PTMG having a molecular weight of 1300 and that 1000 parts of E-CL was changed to 1250 parts. The OH value of the product was 55.1 (molecular weight: 2036).

Reference Example 4

A product was synthesized in the same manner as in Reference Example 1 with the exception that 1250 parts of PTMG having a molecular weight of 650 was used instead of 1500 parts of PTMG having a molecular weight of 1300 and that 1250 parts of valerolactone monomer wad used instead of 1250 parts of ε-CL. The OH value of the product was 85.0 (molecular weight: 1320).

Reference Example 5

A product was synthesized in the same manner as in Reference Example 1 with the exception that 1500 parts of a polyester diol having a molecular weight of 1300 obtained from 3-methyl-1,5-pentanediol and adipic acid was used instead of 1500 parts of PTMG having a molecular weight of 1300. The OH value of the product was 51.1 (molecular weight: 2196).

Reference Example 6

A product was synthesized in the same manner as in Reference Example 1 with the exception that 1500 parts of a polyester diol having a molecular weight of 1300 obtained from 1,4-bitanediol and adipic acid was used instead of 1500 parts of PTMG having a molecular weight of 1300 and that the reaction time was changed to 8 hours. The OH value of the product was 50.5 (molecular weight: 2222).

Reference Example 7

A product was synthesized in the same manner as in Reference Example 1 with the exception that 1500 parts of a polycarbonate diol having a molecular weight of 1300 obtained from 1,5-pentanediol and 1,6-hexanediol was used instead of 1500 parts of PTMG having a molecular weight of 1300. The OH value of the product was 53.0 (molecular weight: 2117).

Example 1

Into 505 parts of the lactone-modified diol obtained in Reference Example 1 was added under vigorous stirring 78 parts of 2,4-diisocyanatotoluene (NCO/OH=2.0) and the whole was reacted at 100° C. for 5 hours to obtain a urethane prepolymer (NCO equivalent=1298). After cooling to 60° C., 42 parts of methyl ethyl ketoxime as a blocking agent was added thereto and the mixture was reacted under stirring at 70° C. for 2 hours. The resulting prepolymer was liquid and had a viscosity at 25° C. of 609 dPa·s.

With 100 parts of the prepolymer was blended 7.8 parts of 4,4'-methylene-bis-2-methylcyclohexylamine (NCO/NH$_2$=1.1/1.0). After defoaming, the blend was cast on a release paper at a thickness of about 50 μm and was subjected to thermal treatment at 150° C. for 5 minutes. After cooling, the film was peeled from the release paper and was subjected to a tensile test in a normal state and tensile tests after durability tests. As the durability tests, there were carried out a tensile test after 14 days of treatment under a high temperature and high humidity of 70° C. and 98% RH and a tensile test after 40 hours of light irradiation by a fade-meter. The results are shown in Table 1.

Example 2

Into 500 parts of the lactone-modified diol obtained in Reference Example 2 was added under vigorous stirring 101 parts of 2,4-diisocyanatotoluene (NCO/OH=2.0) and the whole was reacted at 100° C. for 5 hours to obtain a urethane prepolymer (NCO equivalent=1068). After cooling to 60° C., 54 parts of methyl ethyl ketoxime as a blocking agent was added thereto and the mixture was reacted under stirring at 70° C. for 2 hours. The resulting prepolymer was liquid and had a viscosity at 25° C. of 592 dPa·s.

With 100 parts of the prepolymer was blended 9 parts of 4,4'-methylene-bis-2-methylcyclohexylamine. After defoaming, the blend was cast on a release paper at a thickness of about 50 μm and was subjected to thermal treatment at 150° C. for 5 minutes. After cooling, the film was peeled from the release paper and was subjected to a tensile test in a normal state and tensile tests after durability tests. As the durability tests, there were carried out a tensile test after 14 days of treatment under a high temperature and high humidity of 70° C. and 98% RH and a tensile test after 40 hours of light irradiation by a fade-meter. The results are shown in Table 1.

Example 3

Into 500 parts of the lactone-modified diol obtained in Reference Example 3 was added under vigorous stirring 105 parts of 2,4-diisocyanatotoluene (NCO/OH=2.0) and the whole was reacted at 100° C. for 5 hours to obtain a urethane prepolymer (NCO equivalent=1008). After cooling to 60° C., 54 parts of methyl ethyl ketoxime as a blocking agent was added thereto and the mixture was reacted under stirring at 70° C. for 2 hours. The resulting prepolymer was liquid and had a viscosity at 25° C. of 606 dPa·s.

With 100 parts of the prepolymer was blended 9.6 parts of 4,4'-methylene-bis-2-methylcyclohexylamine. After defoaming, the blend was cast on a release paper at a thickness of about 50 μm and was subjected to thermal treatment at 150° C. for 5 minutes. After cooling, the film was peeled from the release paper and was subjected to a tensile test in a normal state and tensile tests after durability tests. As the durability tests, there were carried out a tensile test after 14 days of treatment under a high temperature and high humidity of 70° C. and 98% RH and a tensile test after 40 hours of light irradiation by a fade-meter. The results are shown in Table 1.

Example 4

Into 500 parts of the lactone-modified diol obtained in Reference Example 4 was added under vigorous stirring 132 parts of 2,4-diisocyanatotoluene (NCO/OH=2.0) and the whole was reacted at 100° C. for 5 hours to obtain a urethane prepolymer (NCO equivalent=840). After cooling to 60° C., 72 parts of methyl ethyl ketoxime as a blocking agent was added thereto and the mixture was reacted under stirring at 70° C. for 2 hours. The resulting prepolymer was liquid and had a viscosity at 25° C. of 725 dPa·s.

With 100 parts of the prepolymer was blended 12.6 parts of 4,4'-methylene-bis-2-methylcyclohexylamine. After defoaming, the blend was cast on a release paper at a thickness of about 50 μm and was subjected to thermal treatment at 150° C. for 5 minutes. After cooling, the film was peeled from the release paper and was subjected to a tensile test in a normal state and tensile tests after durability tests. As the durability tests, there were carried out a tensile test after 14 days of treatment under a high temperature and high humidity of 70° C. and 98% RH and a tensile test after 40 hours of light irradiation by a fade-meter. The results are shown in Table 1.

Example 5

Into 300 parts of the lactone-modified diol obtained in Reference Example 5 was added under vigorous stirring 54 parts of 2,4-diisocyanatotoluene (NCO/OH=2.0) and the whole was reacted at 100° C. for 5 hours to obtain a urethane prepolymer (NCO equivalent=1200). After cooling to 60° C., 27 parts of methyl ethyl ketoxime as a blocking agent was added thereto and the mixture was reacted under stirring at 70° C. for 2 hours. The resulting prepolymer was liquid and had a viscosity at 25° C. of 763 dPa·s.

With 100 parts of the prepolymer was blended 8 parts of 4,4'-methylene-bis-2-methylcyclohexylamine. After defoaming, the blend was cast on a release paper at a thickness of about 50 μm and was subjected to thermal treatment at 150° C. for 5 minutes. After cooling, the film was peeled from the release paper and was subjected to a tensile test in a normal state and tensile tests after durability tests. As the durability tests, there were carried out a tensile test after 14 days of treatment under a high temperature and high humidity of 70° C. and 98% RH and a tensile test after 40 hours of light irradiation by a fade-meter. The results are shown in Table 1.

Example 6

Into 300 parts of the lactone-modified diol obtained in Reference Example 6 was added under vigorous stirring 53 parts of 2,4-diisocyanatotoluene (NCO/OH=2.0) and the whole was reacted at 100° C. for 5 hours to obtain a urethane prepolymer (NCO equivalent=1200). After cooling to 60° C., 27 parts of methyl ethyl ketoxime as a blocking agent was added thereto and the mixture was reacted under stirring at 70° C. for 2 hours. The resulting prepolymer was liquid and had a viscosity at 25° C. of 1073 dPa·s.

To 100 parts of the prepolymer was blended 8 parts of 4,4'-methylene-bis-2-methylcyclohexylamine. After defoaming, the blend was cast on a release paper at a thickness of about 50 μm and was subjected to thermal treatment at 150° C. for 5 minutes. After cooling, the film was peeled from the release paper and was subjected to a tensile test in a normal state and tensile tests after durability tests. As the durability tests, there were carried out a tensile test after 14 days of treatment under a high temperature and high humidity of 70° C. and 98% RH and a tensile test after 40 hours of light irradiation by a fade-meter. The results are shown in Table 1.

Example 7

Into 500 parts of the lactone-modified diol obtained in Reference Example 7 was added under vigorous stirring 77.5 parts of 2,4-diisocyanatotoluene (NCO/OH=2.0) and the whole was reacted at 100° C. for 5 hours to obtain a urethane prepolymer (NCO equivalent=1298). After cooling to 60° C., 42 parts of methyl ethyl ketoxime as a blocking agent was added thereto and the mixture was reacted under stirring at 70° C. for 2 hours. The resulting prepolymer was liquid and had a viscosity at 25° C. of 6310 dPa·s.

With 100 parts of the prepolymer was blended 7.6 parts of 4,4'-methylene-bis-2-methylcyclohexylamine. After defoaming, the blend was cast on a release paper at a thickness of about 50 μm and was subjected to thermal treatment at 150° C. for 5 minutes. After cooling, the film was peeled from the release paper and was subjected to a tensile test in a normal state and tensile tests after durability tests. As the durability tests, there were carried out a tensile test after 14 days of treatment under a high temperature and high humidity of 70° C. and 98% RH and a tensile test after 40 hours of light irradiation by a fade-meter. The results are shown in Table 2.

Comparative Example 1

Into 300 parts of PTMG without modification with a lactone having a molecular weight of 2000 which is the same level of the molecular weight of the lactone-modified diol obtained in Reference Example 1 was added under vigorous stirring 54 parts of 2,4-diisocyanatotoluene (NCO/OH=2.0) and the whole was reacted at 100° C. for 5 hours to obtain a urethane prepolymer. After cooling to 60° C., 30 parts of methyl ethyl ketoxime as a blocking agent was added thereto and the mixture was reacted under stirring at 70° C. for 2 hours. The resulting prepolymer solidified and could not be used without solvent.

Comparative Example 2

Into 300 parts of a polyester diol having a molecular weight of 2000 and obtained from 1,4-butanediol and adipic acid was added under vigorous stirring 54 parts of 2,4-diisocyanatotoluene (NCO/OH=2.0) and the whole was reacted at 100° C. for 5 hours to obtain a urethane prepolymer. After cooling to 60° C., 30 parts of methyl ethyl ketoxime as a blocking agent was added thereto and the mixture was reacted under stirring at 70° C. for 2 hours. The resulting prepolymer solidified and could not be used without solvent.

Comparative Example 3

Into 300 parts of a polycarbonate diol having a molecular weight of 2000 and obtained from 1,4-butanediol was added under vigorous stirring 54 parts of 2,4-diisocyanatotoluene (NCO/OH 2.0) and the whole was reacted at 100° C. for 5 hours to obtain a urethane prepolymer. After cooling to 60° C., 30 parts of methyl ethyl ketoxime as a blocking agent was added thereto and the mixture was reacted under stirring at 70° C. for 2 hours. The resulting prepolymer solidified and could not be used without solvent.

Comparative Example 4

Into 345 parts of a polypropylene glycol having a molecular weight of 2000 (PPG-2000) as a representative of polypropylene oxide-type polyether was added under vigorous stirring 62 parts of 2,4-diisocyanatotoluene (NCO/OH=2.0) and the whole was reacted at 100° C. for 5 hours to obtain a urethane prepolymer (NCO equivalent=1115). After cooling to 60° C., 36 parts of methyl ethyl ketoxime as a blocking agent was added thereto and the mixture was reacted under stirring at 70° C. for 2 hours. The resulting prepolymer was liquid and had a viscosity at 25° C. of 200 dPa·s.

With 100 parts of the prepolymer was blended 11.4 parts of 4,4'-methylene-bis-2-methylcyclohexylamine. After defoaming, the blend was cast on a release paper at a thickness of about 50 μm and was subjected to thermal treatment at 150° C. for 5 minutes. After cooling, the film was peeled from the release paper and was subjected to a tensile test in a normal state and tensile tests after durability tests. As the durability tests, there were carried out a tensile test after 14 days of treatment under a high temperature and high humidity of 70° C. and 98% RH and a tensile test after 40 hours of light irradiation by a fade-meter. The results are shown in Table 2.

TABLE 1

|  | Example 1 | Example 2 | Example 3 | Example 4 | Example 5 | Example 6 |
|---|---|---|---|---|---|---|
| Tensile Test In Normal State | | | | | | |
| Tensile strength (MPa) | 52 | 58 | 56 | 62 | 57 | 60 |
| Elongation (%) | 440 | 412 | 445 | 370 | 435 | 425 |
| Tensile Test After Durability Test (70° C., 98% RH × 14 days) | | | | | | |
| Tensile strength (MPa) | 42 | 47 | 46 | 49 | 42 | 46 |
| Residual rate (%) | 80 | 81 | 83 | 79 | 73 | 77 |
| Elongation (%) | 387 | 367 | 409 | 326 | 352 | 340 |
| Residual rate (%) | 88 | 89 | 92 | 88 | 81 | 80 |
| Tensile Test After 40 Hours Of Light Irradiation By Fade-meter | | | | | | |
| Tensile strength (MPa) | 30 | 33 | 33 | 36 | 39 | 41 |
| Residual rate (%) | 72 | 70 | 71 | 73 | 92 | 90 |
| Elongation (%) | 283 | 261 | 286 | 245 | 327 | 309 |
| Residual rate (%) | 73 | 71 | 70 | 75 | 93 | 91 |

TABLE 2

|  | Example 7 | Comparative Example 1 | Comparative Example 2 | Comparative Example 3 | Comparative Example 4 |
|---|---|---|---|---|---|
| Tensile Test In Normal State | | | | | |
| Tensile strength (MPa) | 62 | —*) | —*) | —*) | 23 |
| Elongation (%) | 440 | —*) | —*) | —*) | 245 |
| Tensile Test After Durability Test (70° C., 98% RH × 14 days) | | | | | |
| Tensile strength (MPa) | 59 | —*) | —*) | —*) | 11 |
| Residual rate (%) | 95 | —*) | —*) | —*) | 48 |
| Elongation (%) | 431 | —*) | —*) | —*) | 93 |
| Residual rate (%) | 98 | —*) | —*) | —*) | 38 |
| Tensile Test After 40 Hours Of Light Irradiation By Fade-meter | | | | | |
| Tensile strength (MPa) | 60 | —*) | —*) | —*) | 0 |
| Residual rate (%) | 96 | —*) | —*) | —*) | 0 |
| Elongation (%) | 418 | —*) | —*) | —*) | 0 |
| Residual rate (%) | 95 | —*) | —*) | —*) | 0 |

*)The prepolymers of Comparative Examples 1 to 3 solidified and could not be processed.

The blocked prepolymer of the invention is liquid, so that it is possible to use the prepolymer without solvent upon processing such as coating or casting. Moreover, the resin derived from the prepolymer is excellent in durability and mechanical strength, and also is not harmful to the environment.

While the invention has been described in detail and with reference to specific examples thereof, it will be apparent to one skilled in the art that various changes and modifications can be made therein without departing from the spirit and scope thereof.

What is claimed is:

1. A method for producing a liquid urethane prepolymer which comprises:

reacting a lactone-modified diol (3) with a polyisocyanate (4) to form a urethane prepolymer precusor having an isocyanate group (5), wherein said lactone-modified diol (3) is obtained by ring-opening addition polymerization of a lactone monomer (2) with a diol (1) selected from the group consisting of a polyalkylene ether diol and a polyester diol obtained by reaction of a dihydric alcohol with a dibasic carboxylic acid; and then reacting said urethane prepolymer precursor (5) with a blocking agent (6) to obtain the liquid urethane prepolymer having the isocyanate group blocked by the blocking agent.

2. The method for producing a liquid urethane prepolymer according to claim 1, wherein said diol (1) has a number-average molecular weight of 500 to 2000, and 10 to 100 parts by weight of the lactone monomer (2) is subjected to the ring-opening addition polymerization with respect to 100 parts by weight of said diol (1).

3. The method for producing a liquid urethane prepolymer according to claim 1, wherein said polyalkylene ether diol is a homopolymer or copolymer of tetrahydrofuran.

4. The method for producing a liquid urethane prepolymer according to claim 1, wherein said polyester diol is a polyester diol obtained from an alkylene glycol having 2 to 10 carbon atoms and adipic acid.

5. The method for producing a liquid urethane prepolymer according to claim 1 wherein said lactone monomer (2) is ε-caprolactone.

6. The method for producing a liquid urethane prepolymer according to claim 1, wherein said polyfunctional isocyanate (4) is an aromatic polyisocyanate.

7. The method for producing a liquid urethane prepolymer according to claim 1, wherein said isocyanate group-blocking agent (6) is methyl ethyl ketoxime.

8. A resin composition comprising a liquid urethane prepolymer obtained by a method according to claim 1 and a compound having two or more active hydrogens.

9. The resin composition according to claim 8, wherein said compound having two or more active hydrogens is a polyamine.

* * * * *